Oct. 18, 1949.  J. W. GREIG  2,485,047
VEHICLE BODY FLOOR STRUCTURE
Filed Feb. 17, 1947  2 Sheets-Sheet 1
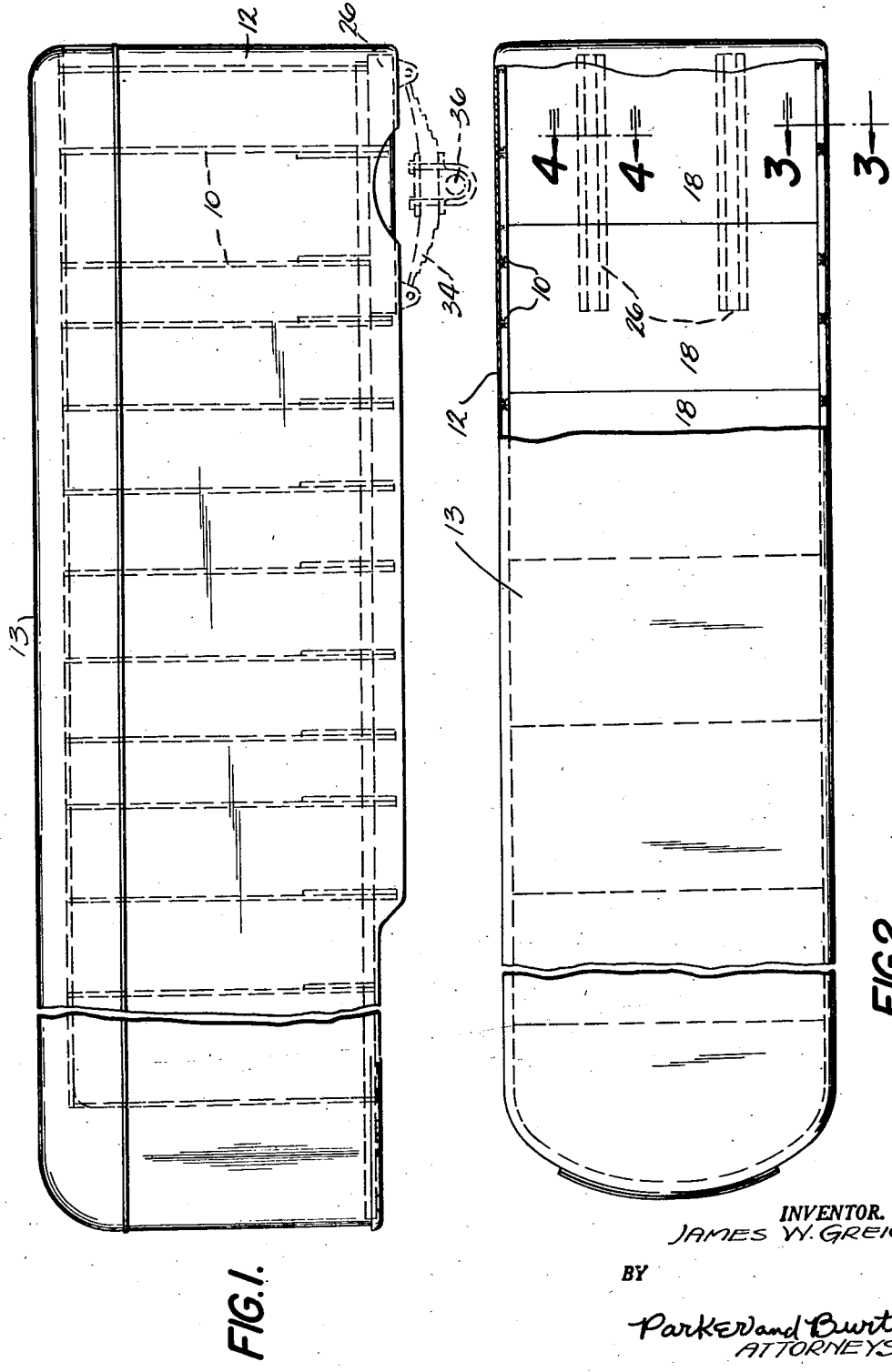
INVENTOR.
JAMES W. GREIG.
BY
Parker and Burton
ATTORNEYS.

Oct. 18, 1949.   J. W. GREIG   2,485,047
VEHICLE BODY FLOOR STRUCTURE
Filed Feb. 17, 1947   2 Sheets-Sheet 2
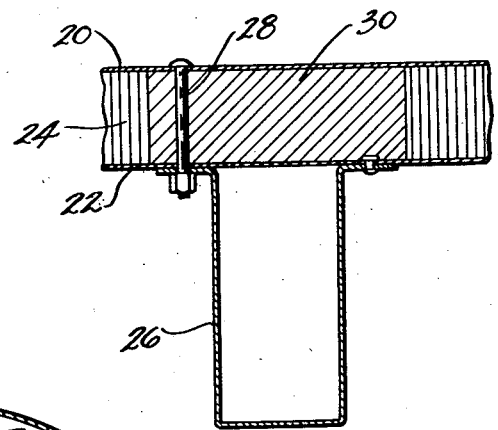
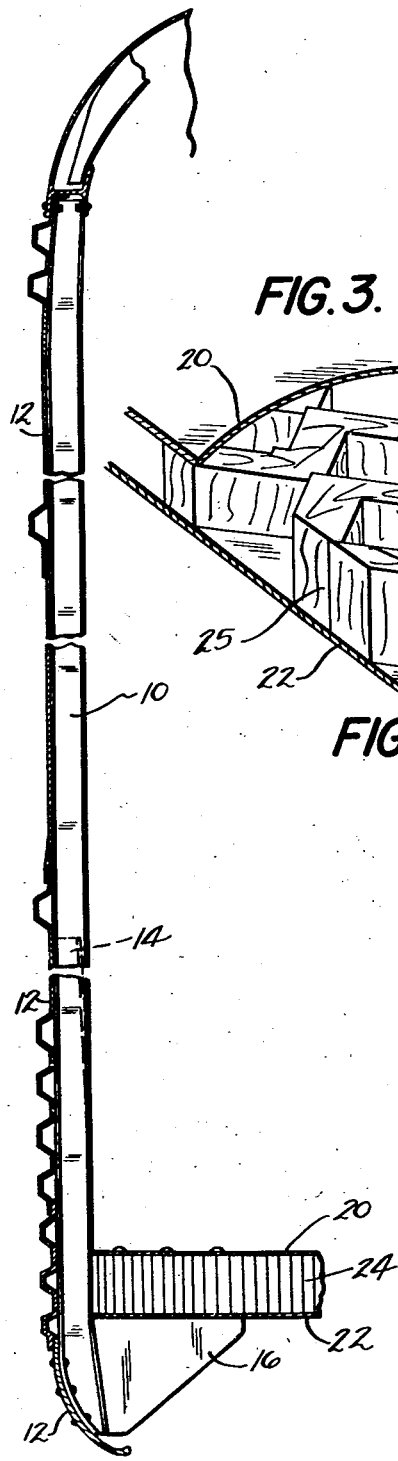
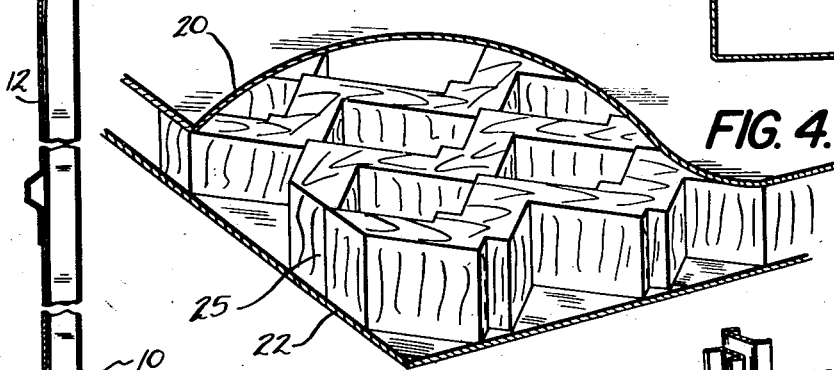
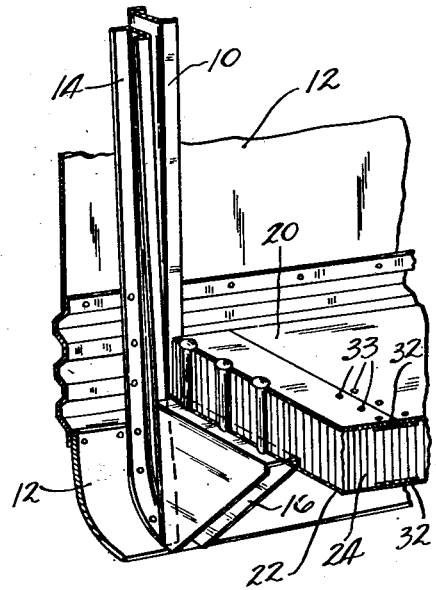
INVENTOR.
JAMES W. GREIG.
BY
Parker and Burton
ATTORNEYS.

Patented Oct. 18, 1949

2,485,047

UNITED STATES PATENT OFFICE 2,485,047

VEHICLE BODY FLOOR STRUCTURE

James W. Greig, Detroit, Mich., assignor to Woodall Industries Incorporated, Detroit, Mich., a corporation of Michigan Application February 17, 1947, Serial No. 729,017

6 Claims. (Cl. 296—28)

This invention relates to improvements in vehicle bodies and particularly to an improved road vehicle body floor structure.

More particularly the invention relates to an improved load bearing floor assembly for a vehicle body and improvements in means whereby the floor is coordinated with the side walls of the body.

It is now and has been conventional practice to provide road vehicle bodies with a frame structure upon which the floor and side walls are supported. Such frame structure commonly comprises a pair of longitudinal side frame members and transverse frame members extending between the side frame members. The floor is supported upon these frame members as are the side walls of the body.

An object of this invention is to develop a body provided with a floor assembly which is so fabricated that it can be suspended between the side walls of the body without the employment of any transverse load bearing floor supporting beams disposed thereunderneath. Such floor is so formed that it serves as a load bearing beam in and of itself and transmits the load disposed upon the floor to the side walls of the body and to the supporting springs for the vehicle. This floor serves in and of itself in combination with the body side walls to take and transmit all the weight and forces necessary to the proper functioning of the structure.

A further object is to provide a floor assembly of the character described which eliminates the necessity of providing the conventional longitudinal and transverse frame members commonly disposed underneath the floor in vehicle body constructions.

Another object is to provide a floor assembly of the character described which is of minimum weight and employs a minimum amount of material and which reduces substantially the overall weight of the vehicle body especially when incorporated in a large load carrying body such as a large trailer body.

More particularly an object is to provide a floor assembly made up of a plurality of lightweight laminated panel sections so constructed and so suspended between the body side walls as to be capable of carrying a heavy load and transmitting it to the side walls of the body and also transmitting the load to the vehicle axle assembly all without the employment of the usual additional floor supporting framework.

The specific laminated panel sections are of simple design and construction and each includes two outer surface layers of load bearing material which may be metal or plastic composition sheets. For example, steel or aluminum sheets or laminate sheets of fiber glass and resin composition may be used and securely adhered to the opposite outer surfaces of a lightweight core layer of high compression strength. The core layer may be of lightweight fibrous material such as balsa wood so cut that the grain of the wood extends perpendicularly to the two outer sheets thereby exhibiting high compression resistance.

Other objects, advantages and meritorious features will more fully appear in the following description, appended claims and accompanying drawings wherein:

Fig. 1 is a diagrammatic side elevation of a road vehicle trailer body embodying this invention;

Fig. 2 is a plan partly broken away of the structure shown in Fig. 1,

Fig. 3 is a vertical sectional view taken on the line 3—3 of Fig. 2,

Fig. 4 is a vertical sectional view of a fragmentary character taken on the line 4—4 of Fig. 2, Fig. 5 is a perspective of a fragment of the body side wall and floor assembly, and Fig. 6 is a vertical sectional view through a panel illustrating a fragment thereof embodying my invention and showing a modified form of core layer but with the grain of the wood of the core layer disposed normal with respect to the two outer surface layers.

In this improved vehicle body the load is transmitted to the side walls by the floor assembly. The floor serves the purpose of a load bearing beam as well as serving the purpose of a floor. The side walls of the body are made up of a plurality of upright pillars 10 to which are secured surface sheets 12. These surface sheets may be formed of sheet aluminum or any other suitable material extended between and secured as by riveting or the like to the pillars and constitute a skin structure stretched across and between the pillars and securely fastened thereto. The particular side wall structure shown in Fig. 3 forms the subject of my co-pending application Serial Number 732,103, filed March 3, 1947.

These side walls are connected at the top by a roof 13. Between the lower margins of the side walls the floor is suspended connecting the side walls together and maintaining them in spaced apart relationship. Each pillar 10 is provided at its foot with a floor attaching abutment. In the particular form here shown this abutment includes a stub pillar 14 welded, riveted or otherwise fastened to the main pillar 10 and a bracket 16, which bracket, as shown in Fig. 5, is channel-shaped in cross section and is of angular formation and is secured by welding or riveting to the upright pillar elements 10 and 14. The pillar 10 and the stub pillar 14 are each shown as channel-shaped structures arranged back to back.

The floor itself is so constructed as to extend between the side walls to transmit the load thereto. The construction of the floor assembly is such that the load is carried thereby and transmitted to the side walls without the employment of any supplemental framework or the like. In the drawing the floor assembly is illustrated as comprising a plurality of panel sections indicated as 18. These panel sections extend between the two side walls and opposite ends of the panels are secured to the side walls by the pillar brackets 16. The edges of the panel sections are arranged in abutting relationship. In other words, the panel sections might be described as suspended between the side walls to transmit their load thereto to be carried thereby, and to maintain the spaced arrangement of the side walls. The panel sections not only serve as load carrying sections but certain of them are thrust transmitting sections as they are secured to the axle by the springs and transmit the load to the axle. The floor panel sections are so formed as to serve the purpose normally served by load bearing frame beams.

Each panel section is a three-ply laminated panel and might be described as a sandwich type of structure in which the upper and the lower surface plies 20—22 are high tensile strength sheets such as metal strips or sheets and the core ply 24 is a wood layer arranged therebetween. The upper and lower sheets might be aluminum sheets or sheets of any other suitable metal. They might be plastic sheets such as resin composition sheets reinforced with fibers such as glass fibers, sisal fiber or the like. Any suitable resin material might be used. Thermosetting resins of the urea, phenolic or polyester type might be used. These resin fiber laminates are commercially available. They are light in weight and of high strength.

The core ply must be capable of strongly resisting compression between the two outer sheets and of preventing relative displacement of the two outer sheets. This intermediate or core ply might be formed of any suitable wood. To be strongly resistant to compression the wood is so cut that its grain extends perpendicularly with respect to the upper and lower sheets as shown in Figs. 3, 4, 5 and 6. In Figs. 3, 4 and 5 the core layer 24 is a continuous solid layer in all directions.

In Fig. 6 the core layer 25 is cut away as shown in an expanded sheet or in a semi-honeycomb fashion. The core layer extends along continuous lines transversely and linearly but it exhibits a plurality of spaces. It is of lighter weight and uses less core material than the core layers of Figs. 3, 4 and 5. The fibers of the core layer 25 extend perpendicularly to the metal sheets as do the fibers of the core layers 24 of Figs. 3, 4 and 5. The sheets 20 and 22 are securely adhered to opposite ends of the fibers of the core layer in all instances.

Secure adhesion of the outer layers to the core layer and endwise disposition of the fibers of the core layer with respect to the outer layers are necessary characteristics of the panel to provide the requisite strength. Balsa wood between aluminum sheets with the wood cut across the grain and the grain of the wood layer disposed normal to the aluminum sheets has been found suitable and this provides a lightweight structure which exhibits high strength and load carrying capacity.

The upper and lower sheets 20 and 22 are adhesively secured to the ends of the wood grains of the core ply 24 so that the outer sheets are held thereby against relative displacement. They are held against displacement by being prevented from separation such as might be described as delamination and they are held against displacement relative to each other in a direction parallel to the plane of the shets. Each panel therefore constitutes what might be termed a load carrying beam-like element wherein the core layer serves as the web of the beam. Such core ply, because of the endwise disposition of the wood grain and the securement of the two outer plies together through the core ply against relative displacement, strongly resists any bending or other shifting of one outer sheet with respect to the other outer sheet and prevents any movement of compression.

Inasmuch as displacement of the upper and lower plies 20—22 is prevented, within the limits of the strength of the core layer and its attachment to the two outer layers, the panel will transmit without any bending its supported load to the side walls and also to the axle assembly. The floor panels will also maintain the side walls in their spaced apart relationship and will serve both the purpose of a floor structure and a load transmitting frame structure. The floor panels therefore constitute not only the load carrying floor structure but the stress transmitting frame structure between the side walls and therefrom to the axle.

To secure spring members for an axle structure to the floor, attaching elements 26 may be secured to the floor panels as by bolts 28. In order that the bolts may pass through a panel structure of substantial strength and resistance to breakage, the particular portion of the core layer through which the bolts 28 pass to attach the elements 26 may be formed of wood having a greater strength than balsa wood. For example, some suitable hardwood might be used with the grain disposed endwise to the upper and lower layers and such a part is shown at 30 in Fig. 4. In Fig. 1 a spring element 34 and an axle part 36 are shown schematically.

To secure the several panel sections of the floor together along their abutting edges there are provided metal strips 32. A pair of such strips are shown in Fig. 5. One strip is shown as extending along the upper surface of two panel sections over the joint but underneath the upper metal sheets 20. Another such strip is shown as extending along the lower surface over the joint formed between the two panels and between the core layers and the lower metal sheets 22. These strips 32 may be held in place by blind rivets 33.

What I claim is:

1. In a vehicle body, in combination, two side walls connected at the top by a top wall, a floor panel secured at opposite margins to the opposite side walls and extending in suspension therebetween, said floor panel being a three-ply laminated panel wherein the upper ply and the lower ply are formed each of a metal sheet and wherein the core ply is formed of wood with the grain of the wood extending substantially perpendicularly with respect to the metal plies, said core ply extending along a continuous line both linearly and transversely of the panel between the metal plies and being in contact therewith throughout substantially the entire area thereof, said metal sheets being secured to the core ply against lateral or planar displacement with respect thereto.

2. In a vehicle body, in combination, two side walls connected at the top by a top wall and connected at the bottom by a floor, said floor secured at opposite margins to the opposite side walls and being a three-ply panel the two outer plies of which are formed each of a metal sheet and the intermediate ply of which is formed of wood wherein the wood grain extends perpendicularly with respect to the two metal plies, said wood ply being in a form which extends along continuous lines transversely and linearly of the panel, said metal plies being secured to the wood ply against relative displacement with respect thereto.

3. In a vehicle body, in combination, two side walls connected at the top by a top wall and connected at the bottom by a floor assembly secured at opposite margins thereto and extending in suspension therebetween, said floor comprising a plurality of transversely extending edge abutting three-ply panel sections, each panel section consisting of two outer layers disposed on opposite sides of a core layer, each outer layer being a metal sheet and the core layer being a wood layer with the grain of the wood extending perpendicularly with respect to the outer layer, said outer layers being secured to the core layer against lateral or horizontal displacement with respect thereto.

4. In a vehicle body, in combination, two side walls connected at the top by a top wall, and connected at the bottom by a floor assembly, said floor assembly consisting of a plurality of transversely extending panels each secured at opposite ends to the opposite side walls and constituting the transverse floor connection between the side walls, such side walls constituting the linear connection between the several floor panel sections, each floor panel section being a three-ply laminated panel wherein the two outer plies are metal sheets and the intermediate ply is a wood ply wherein the grain of the wood extends perpendicularly with respect to the metal plies and the metal plies are secured to the intermediate wood ply throughout a wood area which extends contiguously transversely and linearly of the panel.

5. In a vehicle body, in combination, two side walls connected at the top by a top wall and connected at the bottom by a floor assembly, said floor assembly consisting of a plurality of transversely extending panels each secured at opposite ends to the opposite side walls and constituting the transverse floor connection between the side walls, said side walls constituting the linear connection between the several floor panel sections, each floor panel section being a three-ply laminated panel wherein the two outer plies are metal sheets and the intermediate ply is a wood ply wherein the grain of the wood extends perpendicularly with respect to the metal plies and the metal plies are secured to the intermediate wood ply against lateral or planar displacement with respect thereto.

6. In a vehicle body, in combination, two side walls connected at the top by a top wall and connected at the bottom by a floor assembly, said floor assembly consisting of a plurality of transversely extending panels each secured at opposite ends to the opposite side walls and constituting the transverse floor connection between the side walls, said side walls constituting the linear connection between the several floor panel sections, each floor panel section being a three-ply laminated panel wherein the two outer plies are sheets of high tensile strength and the intermediate ply is one which has high resistance to compression between the outer plies and is secured thereto so as to strongly resist relative lateral or planar displacement of the outer plies.

JAMES W. GREIG.

REFERENCES CITED

The following references are of record in the file of this patent:

UNITED STATES PATENTS

| Number | Name | Date |
|---|---|---|
| 1,075,845 | Mills | Oct. 14, 1913 |
| 1,366,168 | Davis | Jan. 18, 1921 |
| 1,486,113 | Baxter et al. | Mar. 4, 1924 |
| 1,883,991 | Ledwinka | Oct. 25, 1932 |
| 2,089,550 | Hacker | Aug. 10, 1937 |
| 2,129,235 | Ragsdale et al. | Sept. 6, 1938 |
| 2,172,571 | Theriault | Sept. 12, 1939 |
| 2,256,037 | Reid | Sept. 16, 1941 |
| 2,309,389 | Goodman | Jan. 26, 1943 |
| 2,400,253 | Ostlund | May 14, 1946 |

FOREIGN PATENTS

| Number | Country | Date |
|---|---|---|
| 356,466 | Great Britain | Sept. 10, 1931 |
| 553,254 | Great Britain | May 13, 1943 |